(12) United States Patent
Kerr

(10) Patent No.: US 11,440,570 B1
(45) Date of Patent: Sep. 13, 2022

(54) ADJUSTABLE MULTI-USE CART

(71) Applicant: KERRGIG LLC, Phoenix, AZ (US)

(72) Inventor: Jeramy Kerr, Tempe, AZ (US)

(73) Assignee: KERRGIG LLC, Phoenix, AZ (US)

( * ) Notice: Subject to any disclaimer, the term of this patent is extended or adjusted under 35 U.S.C. 154(b) by 0 days.

(21) Appl. No.: 17/003,983

(22) Filed: Aug. 26, 2020

Related U.S. Application Data

(60) Provisional application No. 62/891,867, filed on Aug. 26, 2019.

(51) Int. Cl.
*B62B 1/12* (2006.01)
*B62B 1/26* (2006.01)

(52) U.S. Cl.
CPC . *B62B 1/12* (2013.01); *B62B 1/26* (2013.01)

(58) Field of Classification Search
CPC .................................... B62B 1/12; B62B 1/26
See application file for complete search history.

(56) References Cited

U.S. PATENT DOCUMENTS

| | | | | |
|---|---|---|---|---|
| 4,790,549 A * | 12/1988 | Armand | ..................... | B62B 1/12 211/186 |
| 5,464,104 A * | 11/1995 | McArthur | ............. | A47F 5/0025 211/133.3 |
| 8,262,106 B1 * | 9/2012 | Suszynsky | ................ | B62B 1/14 280/47.131 |
| 9,090,276 B1 * | 7/2015 | Ihrke | ........................ | B62B 3/027 |
| 9,150,234 B2 * | 10/2015 | Beaver | ....................... | B62B 3/02 |
| 9,580,096 B2 * | 2/2017 | Beaver | ....................... | B62B 3/10 |
| 11,180,171 B1 * | 11/2021 | Suhling | ..................... | B62B 5/06 |
| 2007/0045973 A1 * | 3/2007 | Grosso | .................... | B62B 1/264 280/47.26 |
| 2012/0074664 A1 * | 3/2012 | Henny | ...................... | B62B 1/12 280/35 |
| 2014/0306410 A1 * | 10/2014 | Becka | ........................ | B62B 1/14 280/47.18 |
| 2014/0319438 A1 * | 10/2014 | Carlson | ...................... | B62B 3/02 254/2 R |
| 2016/0176428 A1 * | 6/2016 | Busser | ....................... | B62B 1/14 280/769 |
| 2018/0079437 A1 * | 3/2018 | Gunther | .................... | B62B 1/12 |
| 2019/0254432 A1 * | 8/2019 | Panigot | .................... | A47C 4/42 |

* cited by examiner

*Primary Examiner* — Bryan A Evans
(74) *Attorney, Agent, or Firm* — Booth Udall Fuller, PLC

(57) ABSTRACT

An adjustable multi-use cart is disclosed. The adjustable multi-use cart may include a core assembly having an upright main member and at least one axle coupled to the upright frame member. A base assembly is removably coupled with the core assembly and includes a main frame member and a distal support cross arm coupled to the main frame member. A platform is removably coupled with the base assembly. A neck assembly is removably coupled with the core assembly and includes an upright main member and at least one cross arm coupled to the upright main member. At least one wheel is removably coupled with the at least one axle. At least one basket is removably coupled with the neck assembly.

19 Claims, 11 Drawing Sheets

ADJUSTABLE MULTI-USE CART

CROSS-REFERENCE TO RELATED APPLICATION

This document claims the benefit of the filing date of U.S. Provisional Patent Application 62/891,867, entitled "ADJUSTABLE MULTI-USE CART" to Kerr, which was filed on Aug. 26, 2019, the contents of which are hereby incorporated herein by reference.

TECHNICAL FIELD

This document generally relates to a compact and efficient way to safely and easily use, transport, or store various tools, and specifically to an adjustable multi-use cart.

BACKGROUND

A large number of professions require the use of tools to perform duties successfully. Many companies have their own workshop with workstations that provide a space to use these tools and store them in an organized way when they are not in use. This allows workers to easily access tools when they are needed but keeps the tools from interfering with the work when they are not in use. These workstations work very well for work that does not need to be completed at a remote location.

On the other hand, for work that must be completed at a remote or in a specific location, such as at a construction site, a farmer's market, or a fair, it is often impossible, impractical, or undesirable to have a permanent workstation there. In such cases, the tools that are required must be carried to the job site.

This presents some problems. First, the job site may be located far from the space that is available for parking. In such a case, the vehicle used to arrive at the job site cannot be used as a workstation and the tools that are needed must be hauled from the parking site to the job site. Depending on the size and number of tools that are needed, this may require a significant amount of time and effort.

Second, once the tools are at the job site, it may be difficult to keep track of all the tools and locate needed tools at the right time. The tools can easily become disorganized and even mixed up with another worker's tools.

SUMMARY

Aspects of this document relate generally to an adjustable multi-use cart that can facilitate the transportation of tools to a job site and serve as a workstation once located at the job site. These aspects may comprise, and implementations may include, one or more or all of the components and steps set forth in the appended claims, which are hereby incorporated by reference.

In one aspect, an adjustable multi-use cart may include a core assembly having an upright main member and at least one axle coupled to the upright frame member. A base assembly is removably coupled with the core assembly and includes a main frame member and a distal support cross arm coupled to the main frame member. A platform is removably coupled with the base assembly. A neck assembly is removably coupled with the core assembly and includes an upright main member and at least one cross arm coupled to the upright main member. At least one wheel is removably coupled with the at least one axle. At least one basket is removably coupled with the neck assembly.

Particular implementations include one or more or all of the following.

The upright main member may include an upper neck coupling receiver. The upper neck coupling receiver may be a hole defined in the end of the upright frame member. The upper neck coupling receiver may have at least one fastener receiving hole therethrough.

A lower base coupling mount may be included and coupled to a front side of a lower end of the upright frame member extending outwardly therefrom. The lower base coupling mount may be orthogonal to the upright frame member. The lower base coupling mount may have at least one fastener receiving hole therethrough.

A tilt assist may be included and coupled to the back side of the lower end of the upright frame member extending outwardly therefrom. The tilt assist may be orthogonal to the upright frame member. The tilt assist may be T-shaped and include a distal cross step configured to receive the foot of a user.

The base assembly may be T-shaped.

The main frame member of the base assembly may include a proximal core coupling receiver. The main frame member of the base assembly may define at least one platform mounting hole. The main frame member of the base assembly may have at least one fastener receiving hole therethrough.

The proximal core coupling receiver of the base assembly may be configured to receive therein and removably couple with the lower base coupling mount of the core assembly. The proximal core coupling receiver may have at least one fastener receiving hole therethrough.

The distal support cross arm of the base assembly may define at least one platform mounting hole.

The at least one cross arm of the neck assembly may include an upper cross arm and a middle cross arm.

The at least one handle may be coupled to the at least one cross arm of the neck assembly.

The at least one cross arm of the neck assembly may include at least one basket coupler.

The upright main member of the neck assembly may include a lower core coupling mount. The lower core coupling mount may have at least one fastener receiving hole therethrough to facilitate removably coupling the core assembly to the neck assembly.

The at least one wheel may include two wheels.

The at least one basket may include two baskets.

In another aspect, an adjustable multi-use cart may include a core assembly having: an upright main member including an upper neck coupling receiver; a lower base coupling mount coupled to a front side of a lower end of the upright frame member extending outwardly therefrom; at least one axle coupled to a back side of a middle of the upright frame member; and a tilt assist coupled to the back side of the lower end of the upright frame member extending outwardly therefrom. A base assembly may be removably coupled with the core assembly and include: a main frame member with a proximal core coupling receiver; and a distal support cross arm coupled to the main frame member. A platform may be removably coupled with the base assembly and include a substantially upper flat surface defining at least one indentation and at least one base mounting hole. A neck assembly may be removably coupled with the core assembly and include: an upright main member with a lower core coupling mount; and at least one cross arm. At least one wheel may be removably coupled with the at least one axle. At least one basket may be removably coupled with the at least one cross arm of the neck assembly.

Particular implementations include one or more or all of the following.

The upper neck coupling receiver may be a hole defined in the end of the upright frame member. The upper neck coupling receiver may have at least one fastener receiving hole therethrough.

The lower base coupling mount may be orthogonal to the upright frame member. The lower base coupling mount may have at least one fastener receiving hole therethrough.

The tilt assist may be orthogonal to the upright frame member. The tilt assist may be T-shaped and include a distal cross step configured to receive the foot of a user.

The base assembly may be T-shaped.

The main frame member of the base assembly may define at least one platform mounting hole. The main frame member of the base assembly may have at least one fastener receiving hole therethrough.

The proximal core coupling receiver of the base assembly may be configured to receive therein and removably couple with the lower base coupling mount of the core assembly. The proximal core coupling receiver may have at least one fastener receiving hole therethrough.

The distal support cross arm of the base assembly may define at least one platform mounting hole.

The at least one cross arm of the neck assembly may include an upper cross arm and a middle cross arm.

The at least one handle may be coupled to the at least one cross arm of the neck assembly.

The at least one cross arm of the neck assembly may include at least one basket coupler.

The lower core coupling mount of the neck assembly may have at least one fastener receiving hole therethrough to facilitate removably coupling the core assembly to the neck assembly.

The at least one wheel may include two wheels.

The at least one basket may include two baskets.

The foregoing and other aspects, features, applications, and advantages will be apparent to those of ordinary skill in the art from the specification, drawings, and the claims.

Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographer, to use only the plain and ordinary meaning of terms in the specification and claims unless he clearly states otherwise and then further, expressly sets forth the particular definition of that term and explain how it differs from the plain and ordinary meaning. Absent such clear statements of intent to apply a particular definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

BRIEF DESCRIPTION OF THE DRAWINGS

Implementations will hereinafter be described in conjunction with the appended drawings, where like designations denote like elements. Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DESCRIPTION

Figure 1:
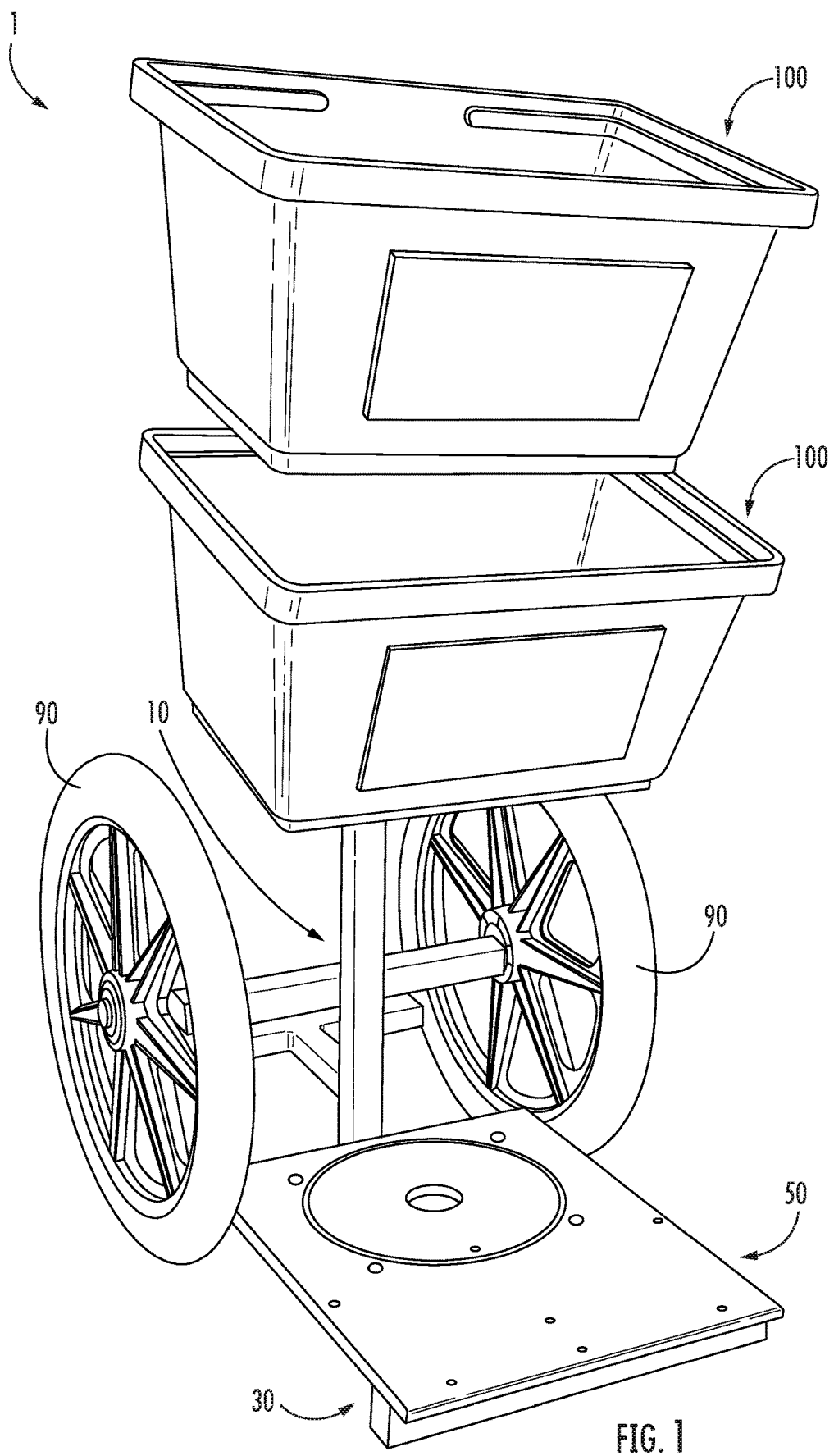
FIG. 1 is a front perspective view of an adjustable multi-use cart implementation.

This document features an adjustable multi-use cart which may be used to ease the transport of tools and equipment over long distances through rough terrain. In addition, the adjustable multi-use cart may serve as a workstation at the worksite. For example, in the case where a parking site is located far from the job site, a worker may use the adjustable multi-use cart to transport tools from the parking site to the job site and then use the adjustable multi-use cart as a workstation to keep the tools organized while working at the job site.

While this disclosure includes a number of implementations in many different forms, there is shown in the drawings and will herein be described in detail particular implementations with the understanding that the present disclosure is to be considered as an exemplification of the principles of the disclosed concepts, and is not intended to limit the broad aspect of the disclosed concepts to the implementations illustrated.

In the following description, reference is made to the accompanying drawings (which are not necessarily to scale and where like designations denote like elements), which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure.

In describing implementations, the following terminology will be used in accordance with the definitions and explanations set out below. Notwithstanding, other terminology, definitions, and explanations may be found throughout this document as well.

The word "exemplary", "example", or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

Structure

There are a variety of adjustable multi-use cart implementations. Generally, an adjustable multi-use cart may include a core assembly including an upright main member and at least one axle coupled to the upright frame member. A base assembly is removably coupled with the core assembly and includes a main frame member and a distal support cross arm coupled to the main frame member. A platform is removably coupled with the base assembly. A neck assembly is removably coupled with the core assembly and includes an upright main member and at least one cross arm coupled to the upright main member. At least one wheel is removably coupled with the at least one axle. At least one basket is removably coupled with the neck assembly.

Figure 2:
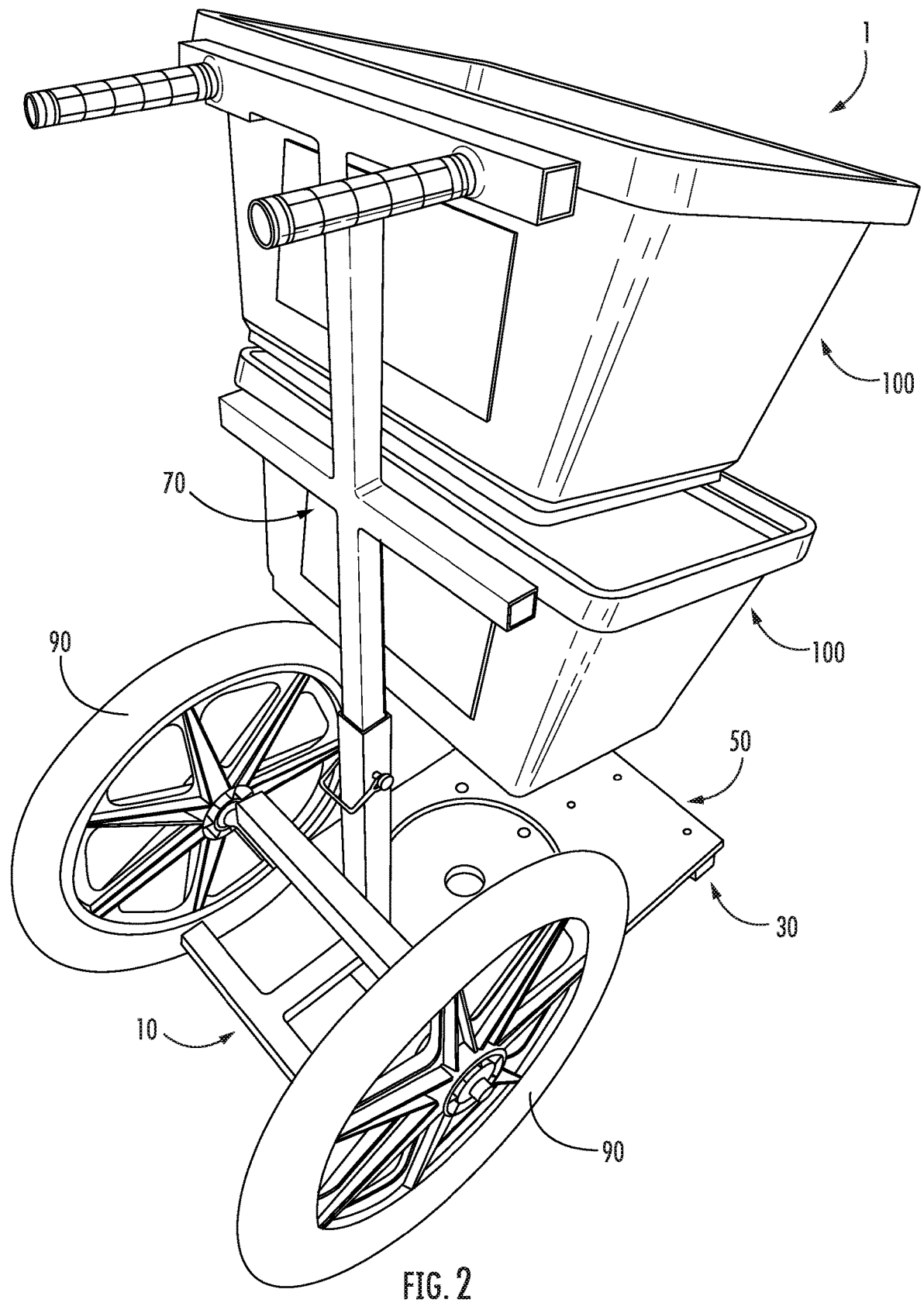
FIG. 2 is a rear perspective view of the adjustable multi-use cart of FIG. 1.

Notwithstanding, turning to FIGS. 1-2 and for the exemplary purposes of this disclosure, an adjustable multi-use cart 1 implementation is shown. The adjustable multi-use cart 1 includes a core assembly 10, a base assembly 30, a platform 50, a neck assembly 70, at least one wheel 90, and at least one basket 100.

Figure 3:
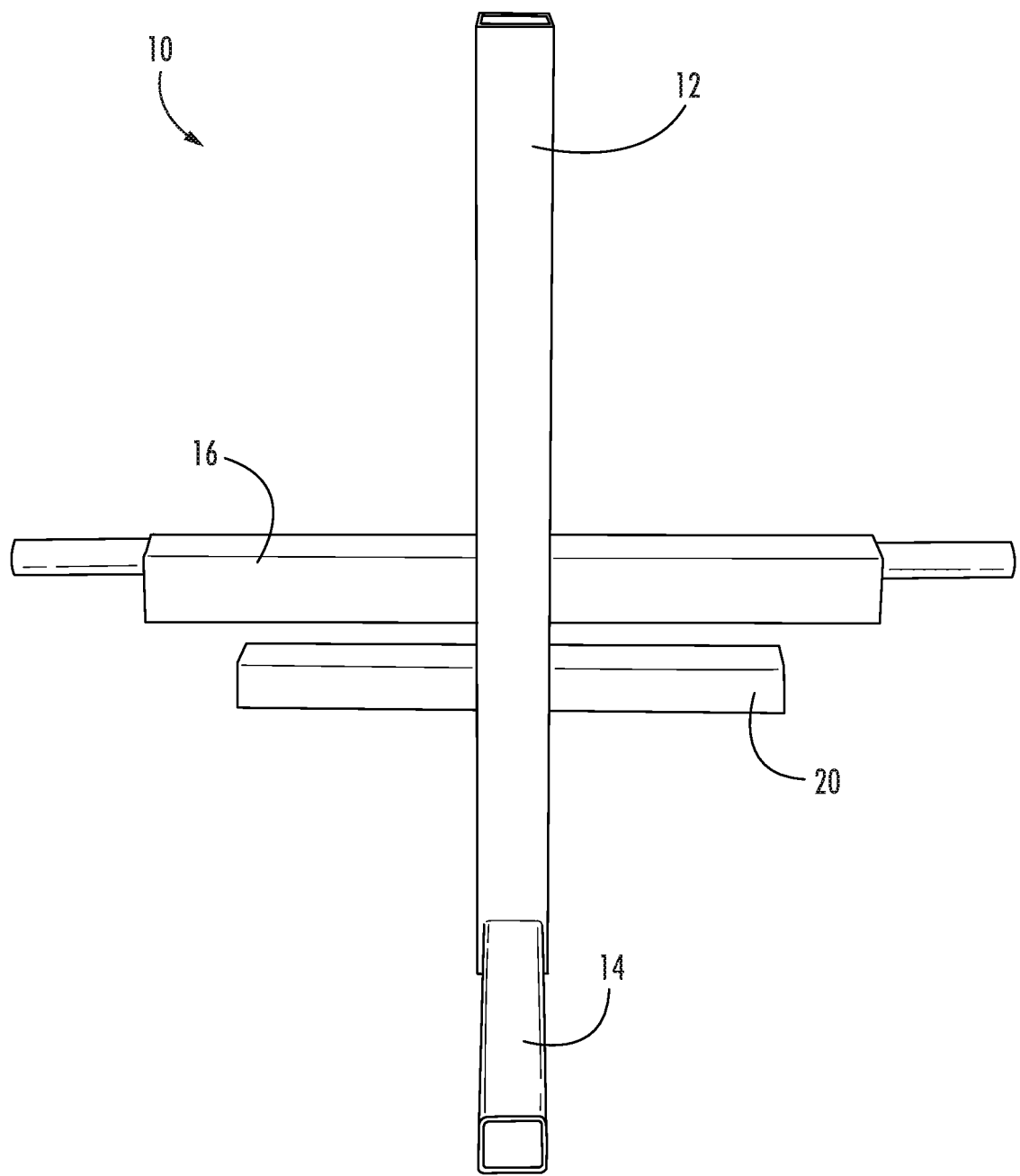
FIG. 3 is a front perspective view of a core assembly of the adjustable multi-use cart of FIG. 1.

In some implementations, the core assembly 10 forms the main supporting structure of the adjustable multi-use cart 1 to which the other components attach. For the exemplary purposes of this disclosure and referring to FIG. 3, the core assembly 10 may include an upright main member with an upper neck coupling receiver 12, a lower base coupling mount 14, at least one axle 16, and a tilt assist 20.

The upper neck coupling receiver 12 may be configured to couple with the neck assembly 70. The upper neck coupling receiver 12 may be a hole defined in the end of the upright frame member. The upper neck coupling receiver 12 may also have at least one fastener receiving hole therethrough (FIGS. 2, 8, 9, and 10) to facilitate removably coupling the core assembly 10 to the neck assembly 70.

The lower base coupling mount 14 may be configured to couple with the base assembly 30. The lower base coupling mount 14 is coupled to a front side of a lower end of the upright frame member and extends outwardly therefrom. For example, the lower base coupling mount 14 may be orthogonal to the upright frame member. The lower base coupling mount 14 may also have at least one fastener receiving hole therethrough (FIG. 8) to facilitate removably coupling the core assembly 10 to the base assembly 30.

The tilt assist 20 is coupled to a back side of the lower end of the upright frame member and extends outwardly therefrom. For example, the tilt assist 20 may be orthogonal to the upright frame member. Tilt assist 20 has a distal cross step configured to receive the foot of a user of adjustable multi-use cart 1. Along with pulling back on the at least one handle 80, a user can simultaneously step down on tilt assist 20 to tip the adjustable multi-use cart 1 backwards to maneuver. The tilt assist 20 may be T-shaped. However, other shapes are possible such as J-shaped, L-shaped, I-shaped, Y-shaped, V-shaped, U-shaped, and the like.

One or more axles 16 may be coupled at its mid-point to a middle of the back side of the upright frame member. For example, the one or more axles 16 may be orthogonal to the upright frame member. The one or more axles 16 may couple with one or more wheels 90, making the cart 1 capable of traversing rough terrain, debris, construction cords, stairs, thresholds, and other barriers. The one or more wheels 90 may be coupled to the one or more axles 16 using any coupling method known in the art. For example, the wheels 90 may be coupled to the axles 16 and then secured using a cotter pin 92 (FIG. 7), a hitch pin, an R-clip, a split pin, a nut and bolt, and the like fasteners.

Figure 4:
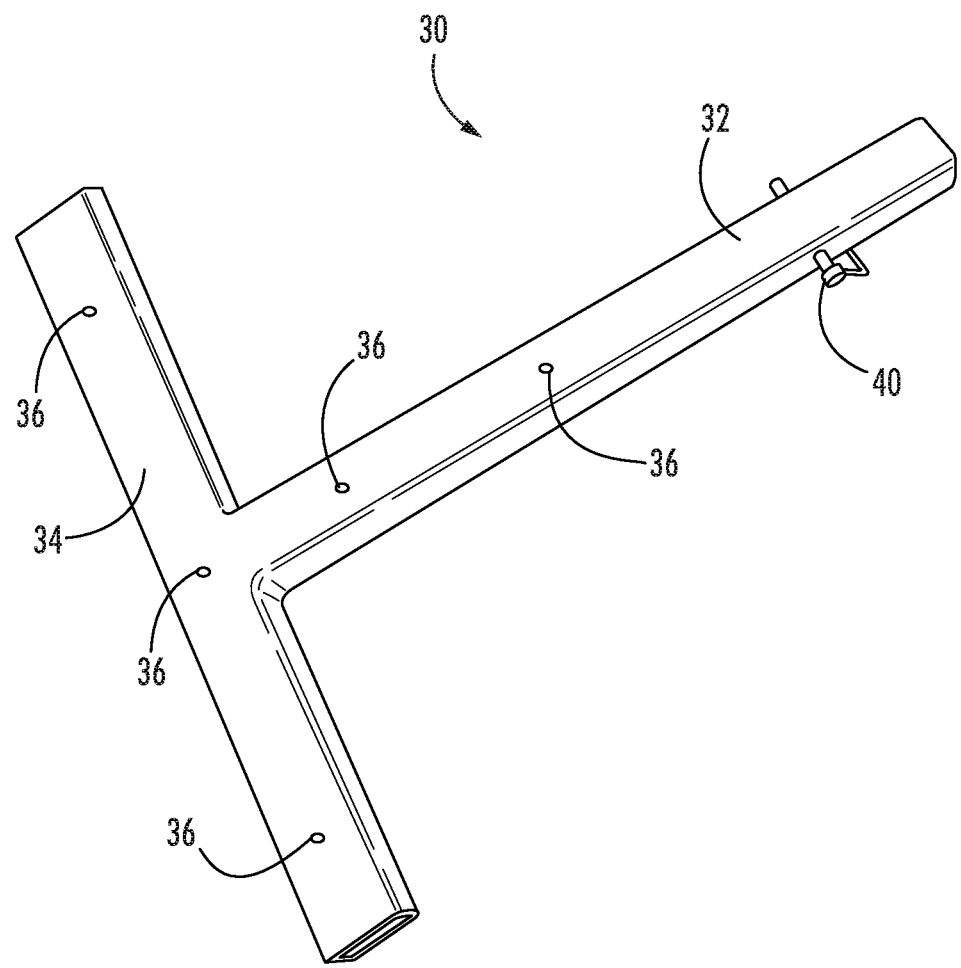
FIG. 4 is a top perspective view of a base assembly of the adjustable multi-use cart of FIG. 1.
Figure 8:
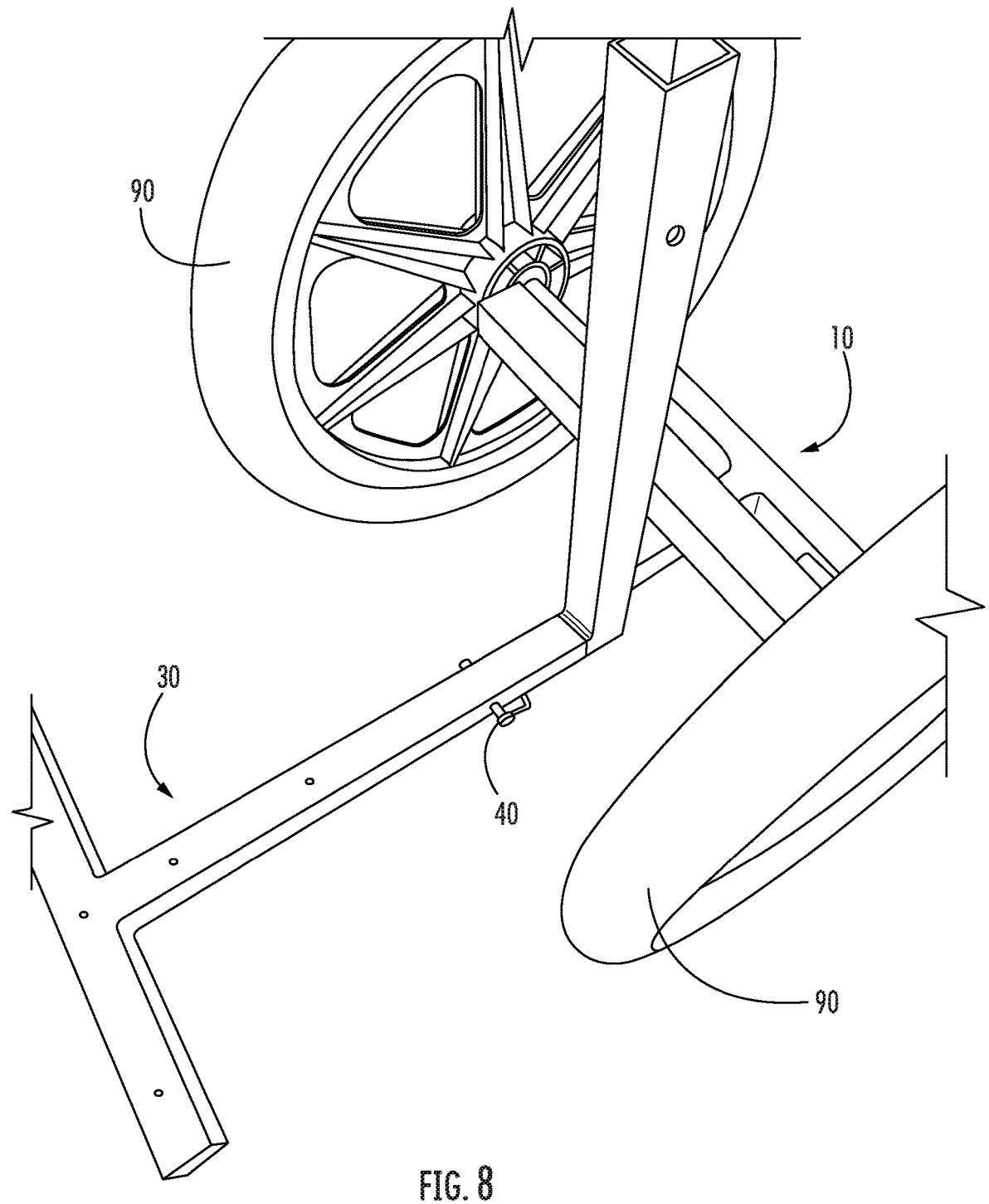
Figure 9:
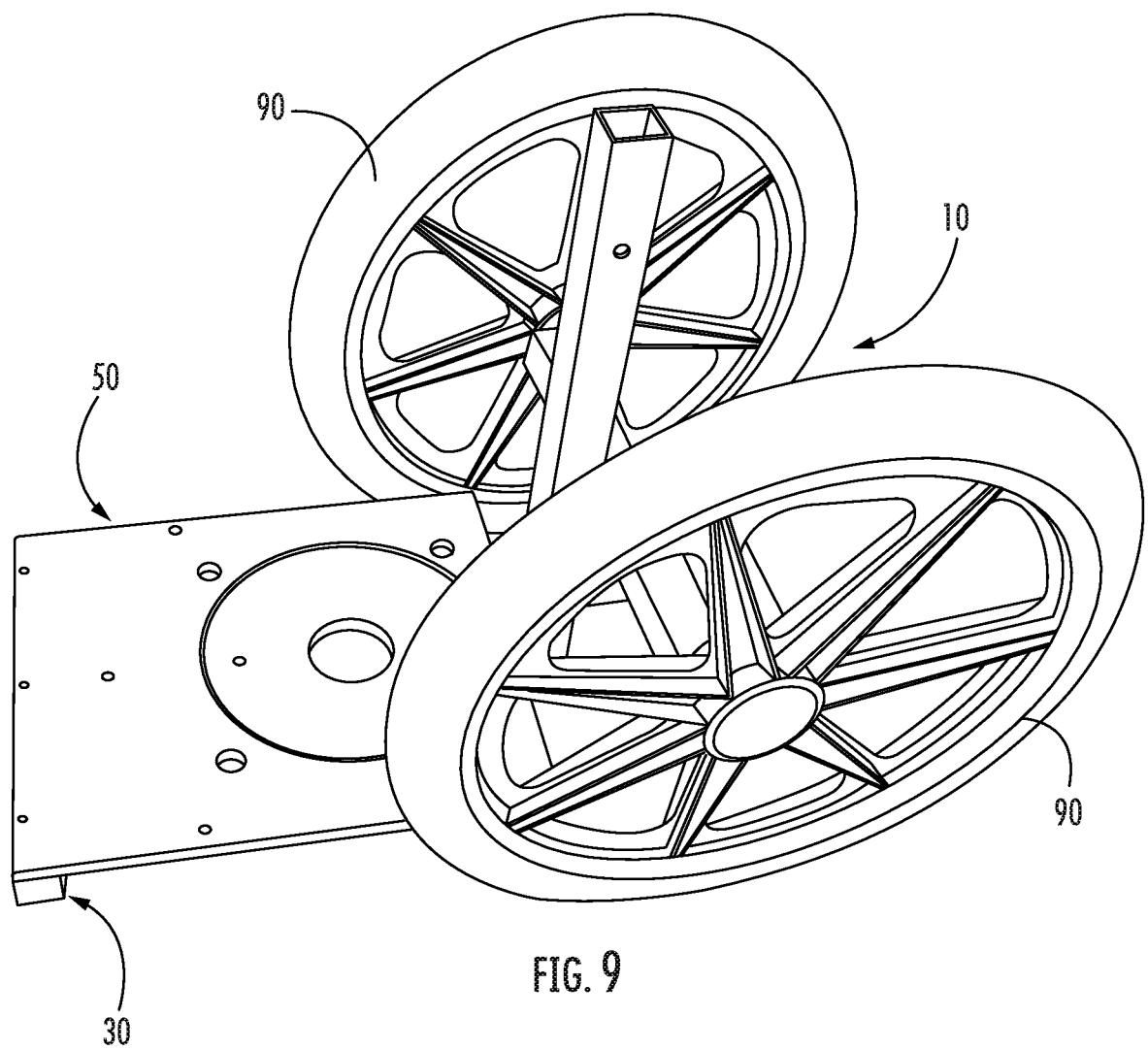

For the exemplary purposes of this disclosure and referring to FIG. 4, the base assembly 30 may include a main frame member with a proximal core coupling receiver 32 and a distal support cross arm 34. The base assembly 30 may be T-shaped. However, other shapes are possible, such as Y-shaped, V-shaped, U-shaped, X, shaped, H-shaped, and the like. Depending on the shape, a different core coupling receiver may need to be employed. The base assembly 30 may also have an upper flat surface configured to interface with a platform 50, as shown in FIGS. 4, 8, and 9.

The main frame member is configured to support platform 50. The main frame member has at least one platform mounting hole 36 defined therein or therethrough as the case may be.

The proximal core coupling receiver 32 is configured to receive therein and removably couple with the lower base coupling mount 14 of the core assembly 10. The proximal core coupling receiver 32 also has at least one fastener receiving hole therethrough (FIGS. 4 and 8) to facilitate removably coupling the base assembly 30 to the core assembly 10. This allows the base assembly 30 to couple with the core assembly 10 when the adjustable multi-use cart 1 is to be used, but to come apart when the adjustable multi-use cart 1 is not in use, facilitating transport of the adjustable multi-use cart 1 itself. The core coupling receiver 32 of the base assembly 30 may couple with the lower base coupling mount 14 of the core assembly 10 through any coupling method known in the art. For example, a bale lock pin 40 (FIGS. 4 and 8), a cotter pin, a hitch pin, an R-clip, a split pin, a nut and bolt, and the like fasteners may be used with the fastener receiving holes.

The distal support cross arm 34 is configured to support platform 50. The distal support cross arm 34 has at least one platform mounting hole 36 defined therein or therethrough as the case may be.

Figure 5:
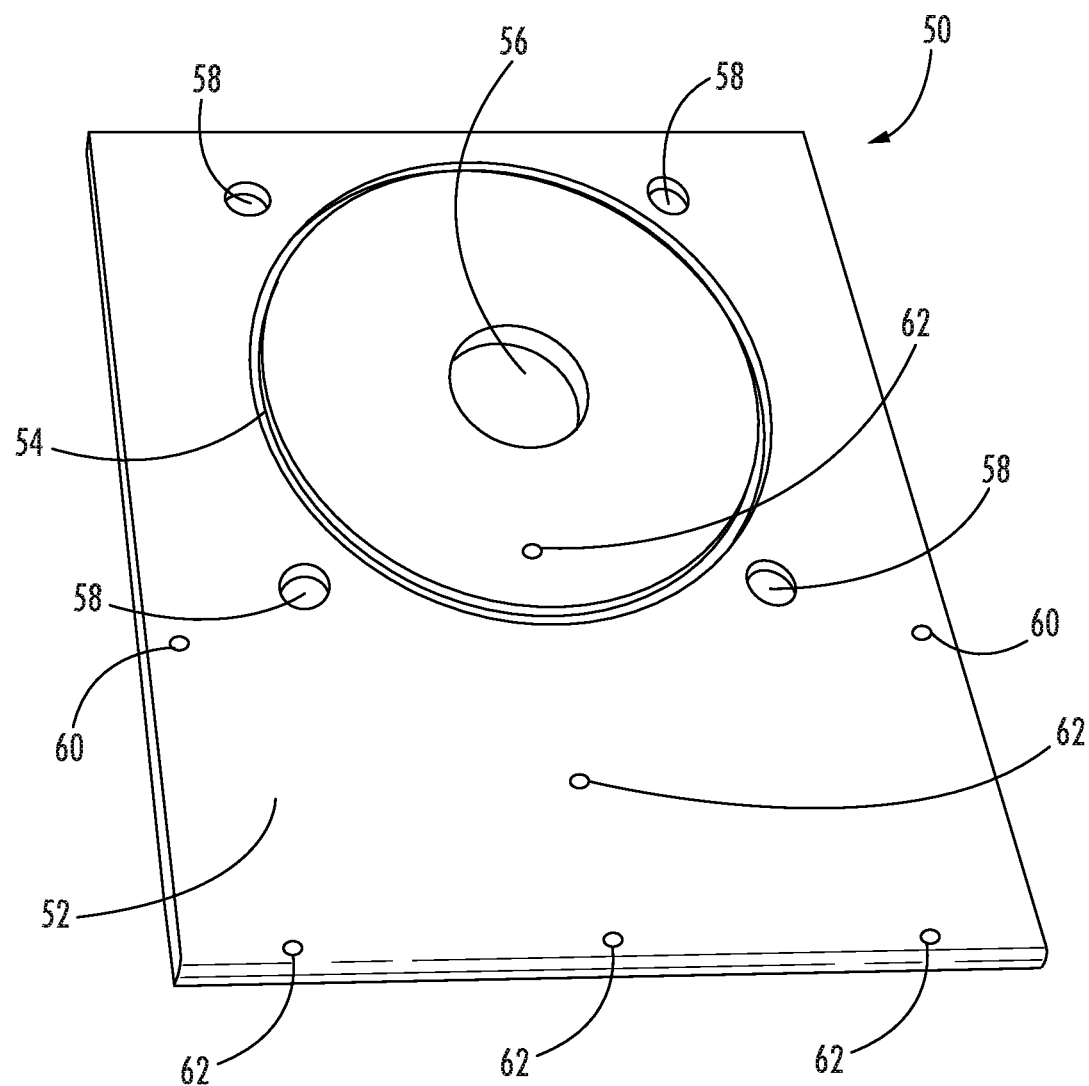
FIG. 5 is a top perspective view of a platform of the adjustable multi-use cart of FIG. 1.

For the exemplary purposes of this disclosure and referring to FIG. 5, the platform 50 may include a substantially upper flat surface 52 on which large objects may be placed. For example, the platform 50 may be used to carry a compressor, toolbox, basket, bucket, cooler, storage boxes, other large tools, other containers, and the like, as shown in FIG. 11A-11D. The platform 50 may have indentations defined in upper flat surface 52 to receive common large objects. For example, as shown in FIG. 5, the platform 50 may have an indented circle 54 in which the bottom of a five-gallon bucket could sit. In addition, the platform 50 may have other indented or through shapes to receive therein or therethrough, for example, an air compressor, other tool, electrical cords, hoses, tie-downs, and the like accessories, such as holes 56, 58, and 60.

The platform 50 may couple with the base assembly 30 through the use of fasteners, screws, clips, or any other coupling devices and method. For example, platform 50 may couple with the base assembly 30 using a screw and at least one platform mounting hole 36 and corresponding at least one base mounting hole 62.

Figure 6:
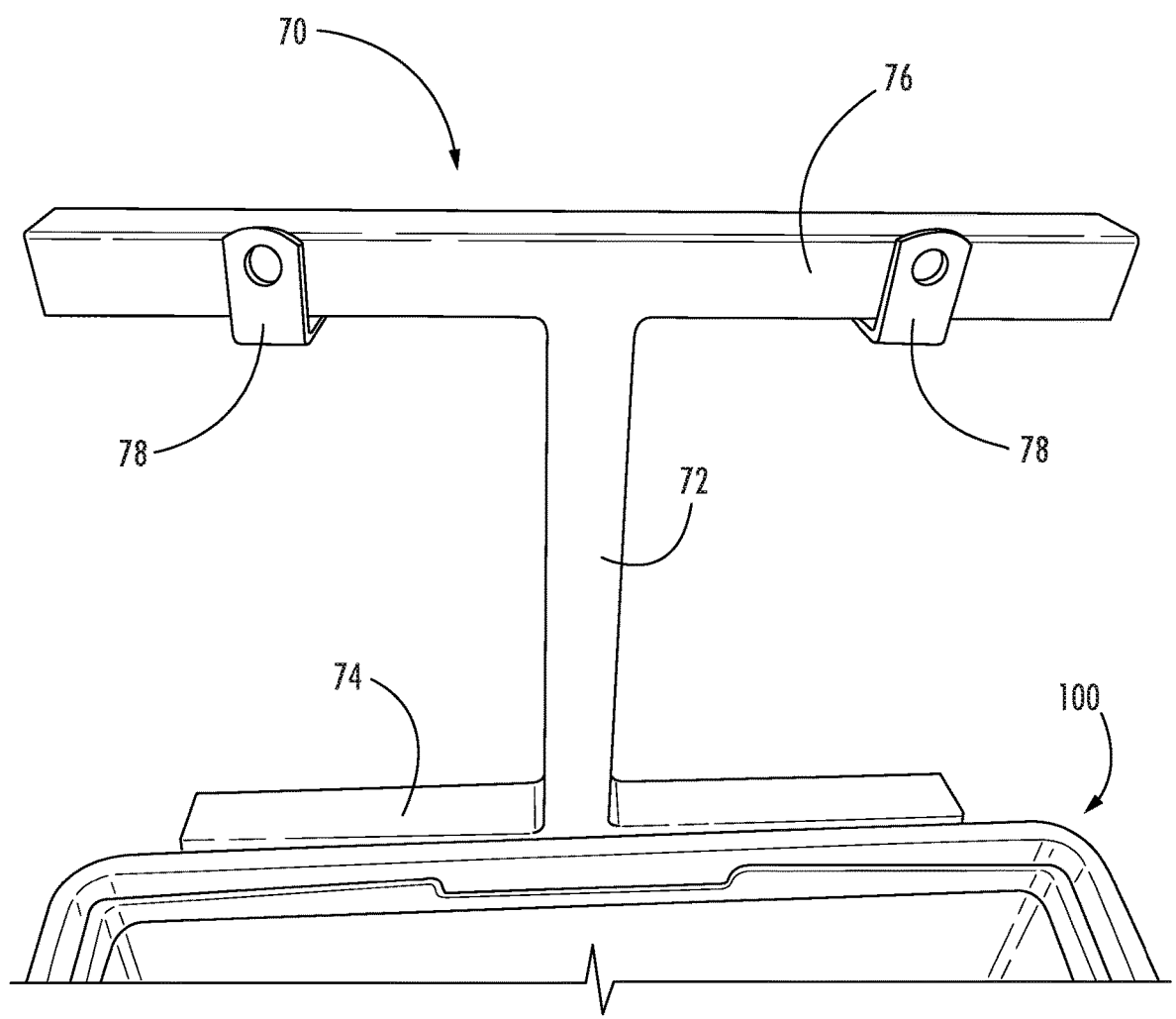
FIG. 6 is a front perspective view of a neck assembly of the adjustable multi-use cart of FIG. 1.
Figure 10:
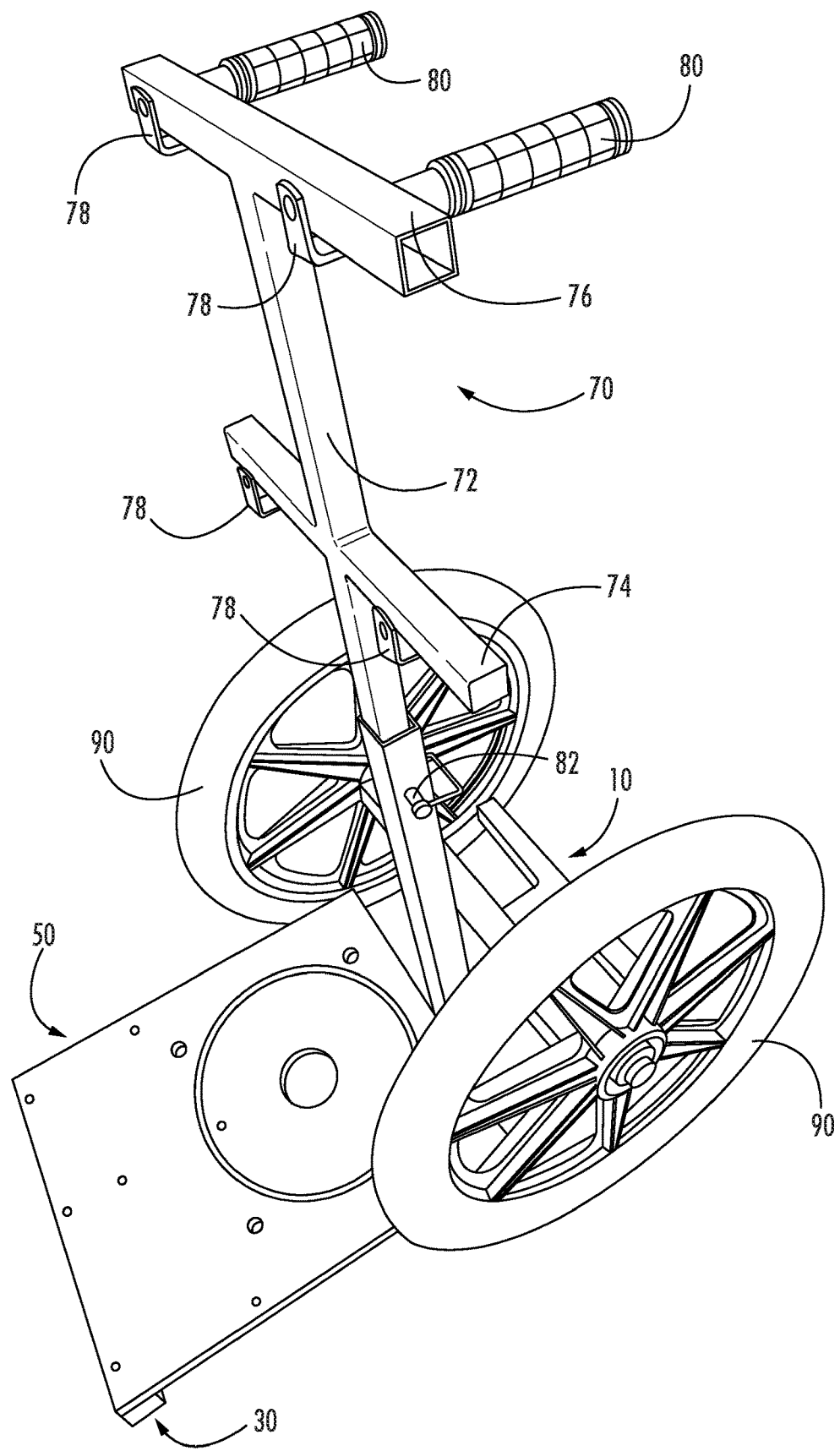
Figure 11A:
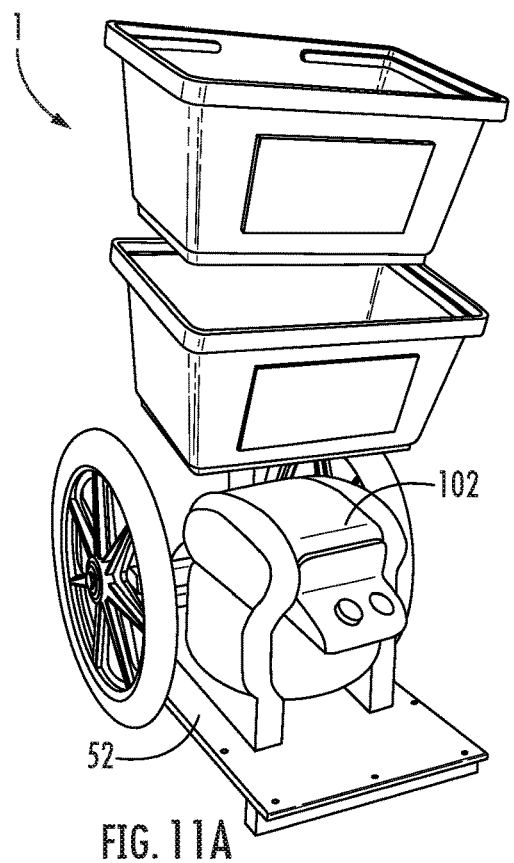
Figure 11B:
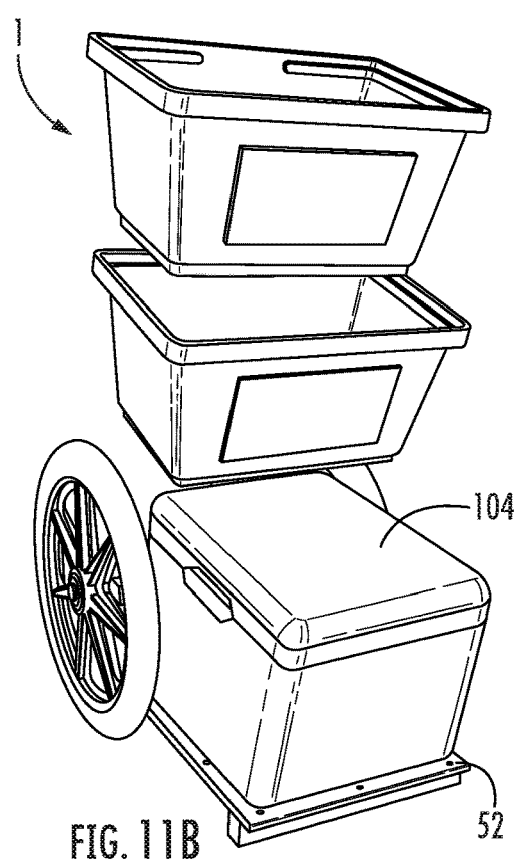
Figure 11C:
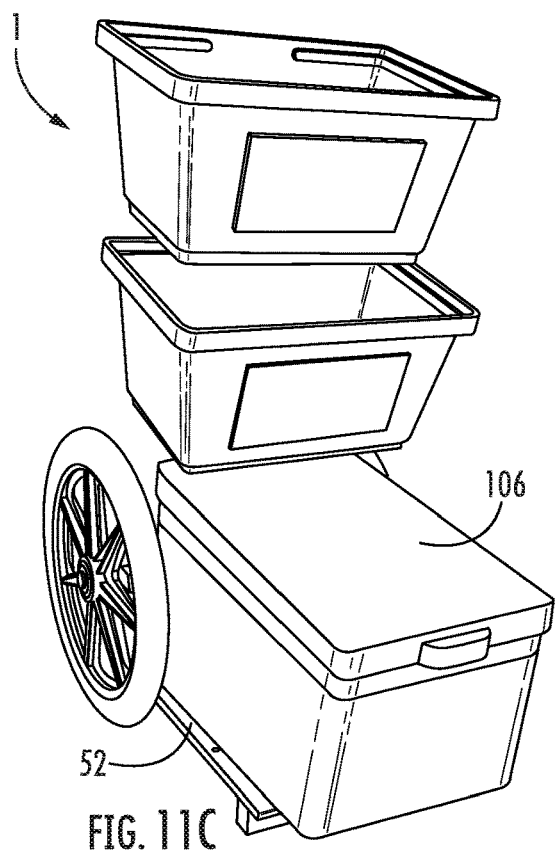
Figure 11D:
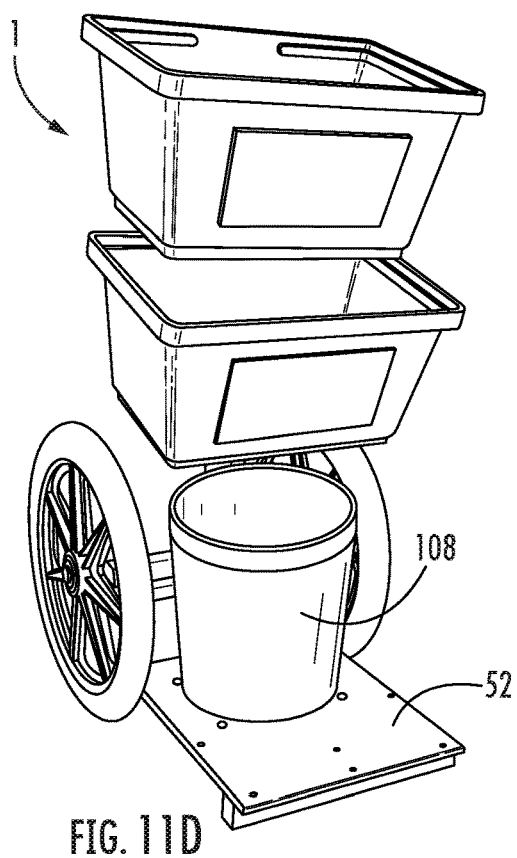

For the exemplary purposes of this disclosure and referring to FIGS. 2, 6, and 10, the neck assembly 70 may include an upright main member 72 with at least one cross arm and a lower core coupling mount. For example, the at least one cross arm may include an upper cross arm 76, a middle cross arm 74. In some implementations, the neck assembly 70 has a plurality of cross arms.

Each cross arm may have at least one basket coupler 78, allowing baskets to removably hang from the cross arms once the adjustable multi-use cart 1 is assembled. For example, the at least one basket coupler 78 includes two basket couplers 78 spaced apart along each cross arm. Obviously, there could be a plurality of basket couplers spaced apart along each cross harm to better support a large, single basket 100, or to support a plurality of little baskets for example. Each basket coupler 78 may be an upright flange with a basket fastening hole there through that allows a fastener to removably couple the lip of a basket 100 to the flange to hold the basket 100 in place. Alternatively for example, the at least one basket coupler may be a continuous upright flange that extends along the length of the cross arm and removably receives the lip of the basket 100.

The neck assembly 70 has at least one handle 80 coupled to the at least one cross arm for maneuvering the adjustable multi-use cart, as shown in FIGS. 2 and 10. The at least one handle 80 may have at least one rubber hand grip. For example, The lower core coupling mount may have at least one fastener receiving hole therethrough (FIGS. 2 and 10) to facilitate removably coupling the core assembly 10 to the neck assembly 70. Specifically, the lower core coupling mount is configured to removably couple with the upper neck coupling receiver 12 of the core assembly 10. This allows the neck assembly 70 to couple with the core assembly 10 when the adjustable multi-use cart 1 is to be used, but to come apart when the adjustable multi-use cart 1 is not in use, facilitating transport of the adjustable multi-use cart 1 itself. The lower core coupling mount of the neck assembly 70 may couple with the upper neck coupling receiver 12 of the core assembly 10 through any coupling method known in the art. For example, a bale lock pin 82 (FIG. 10), a cotter pin, a hitch pin, an R-clip, a split pin, a nut and bolt, and the like fasteners may be used with the fastener receiving holes.

For the exemplary purposes of this disclosure and referring to FIGS. 1, 2, 7, and 10, the at least one wheel 90 is removably coupled to the at least one axle 16. In some implementations, there are two wheels 90 removably coupled to either end of the at least one axle 16. In other implementations there are three or more wheels 90 and an appropriate number of axels 16.

For the exemplary purposes of this disclosure and referring to FIGS. 1, 2, 6, and 11A-11D, at least one basket may be removably coupled to the neck assembly 70 and is configured to hold a variety of tools and supplies and be easily rearranged to adapt to the nature of the job being performed and the tools that are needed. The at least one basket might include two baskets 100. As explained above, there could be just one basket 100 employed or a plurality of littler baskets depending on the application and the tools and supplies needed.

OTHER IMPLEMENTATIONS

Many additional implementations are possible, some of which have been described above.

It should be understood that the components depicted and discussed above are non-limiting examples, and that the contemplated components may be combined with any of the other components in other implementations.

Although there are a variety of adjustable multi-use cart implementations, for the exemplary purposes of this disclosure, an adjustable multi-use cart may have a core coupling receiver of the base assembly that may telescope into or around the lower base coupling mount of the core assembly, making the size of the base assembly adjustable along one dimension. For example, this may be accomplished by the main frame member having a plurality of fastener receiving holes therethrough to facilitate removably coupling the base assembly to the core assembly. This allows different sizes of platforms to be used, thus accommodating a greater number of large objects that can be carried on the platform.

Although there are a variety of adjustable multi-use cart implementations, for the exemplary purposes of this disclosure, an adjustable multi-use cart may have an upper neck coupling receiver of the core assembly that may telescope into or around the core coupling mount of the neck assembly, making the height of the neck assembly adjustable along one dimension. For example, this may be accomplished by the upright frame member having a plurality of fastener receiving holes therethrough to facilitate removably coupling the neck assembly to the core assembly. This may be desirable both to accommodate the varying heights of users and to allow users to select different sizes of baskets 100 depending on the job being performed and the tools that are needed.

Further implementations are within the description and the claims.

Components, Specifications, Materials, and Manufacture

In places where the description above refers to particular adjustable multi-use cart implementations, it should be readily apparent that a number of modifications may be made without departing from the spirit thereof and that these implementations may be applied to other implementations disclosed or undisclosed. The presently disclosed adjustable multi-use cart implementations are, therefore, to be considered in all respects as illustrative and not restrictive.

It will be understood that implementations of the adjustable multi-use cart are not limited to the specific components disclosed herein, as virtually any components consistent with the intended operation of the various adjustable multi-use cart implementations may be utilized. Accordingly, for example, it should be understood that, while the drawings and accompanying text show and describe particular adjustable multi-use cart implementations, any such implementation and implementing components may comprise any shape, size, style, type, model, version, class, grade, measurement, concentration, material, weight, quantity, and/or the like consistent with the intended operation of adjustable multi-use cart implementations. It will also be understood that that implementations are not limited to uses of any specific components, provided that the components selected are consistent with the intended operation of an adjustable multi-use cart implementation.

Additionally, it is specifically contemplated that the components included in particular adjustable multi-use cart implementations may be formed of any of many different types of materials or combinations that can readily be formed into shaped objects and that are consistent with the intended operation of the adjustable multi-use cart implementations. For example, the components may be formed of: rubbers (synthetic and/or natural) and/or other like materials; glasses (such as fiberglass), carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, spring steel, aluminum, any combination thereof, and/or other like materials; alloys, such as aluminum alloy, titanium alloy, magnesium alloy, copper alloy, any combination thereof, and/or other like materials; any other suitable material; and/or any combination of the foregoing.

For example, in some implementations, the components of the core, base, and neck assemblies may be formed of metal tubes and/or bars.

Furthermore, various adjustable multi-use cart implementations may be manufactured using conventional procedures as added to and improved upon through the procedures described here. Some components defining adjustable multi-use cart implementations may be manufactured simultaneously and integrally joined with one another, while other components may be purchased pre-manufactured or manufactured separately and then assembled with the integral components. Manufacture of these components separately or simultaneously, as understood by those of ordinary skill in the art, may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material(s) forming the components.

Use, Assembly, and Disassembly

Adjustable multi-use cart implementations are particularly useful for construction and job site applications. For example, a user may use such implementations by assembling the base assembly 30, core assembly 10, and neck assembly 70 together, and attaching the tool baskets 100 and wheels 90. The cart 1 may then be filled with tools and used to haul the tools to the job site. Once at the job site, the user may use the adjustable multi-use cart 1 to keep the tools organized and in one place while working at the job site.

However, implementations are not limited to uses relating to construction and job sites. Rather, any description relating to construction and job site applications are for the exemplary purposes of this disclosure, and implementations may also be used in a variety of other applications with similar results.

Describing the operation of adjustable multi-use cart implementations further and referring to FIGS. 1, 2, and 6-11D specifically, assembly and disassembly may be as follows.

Figure 7:
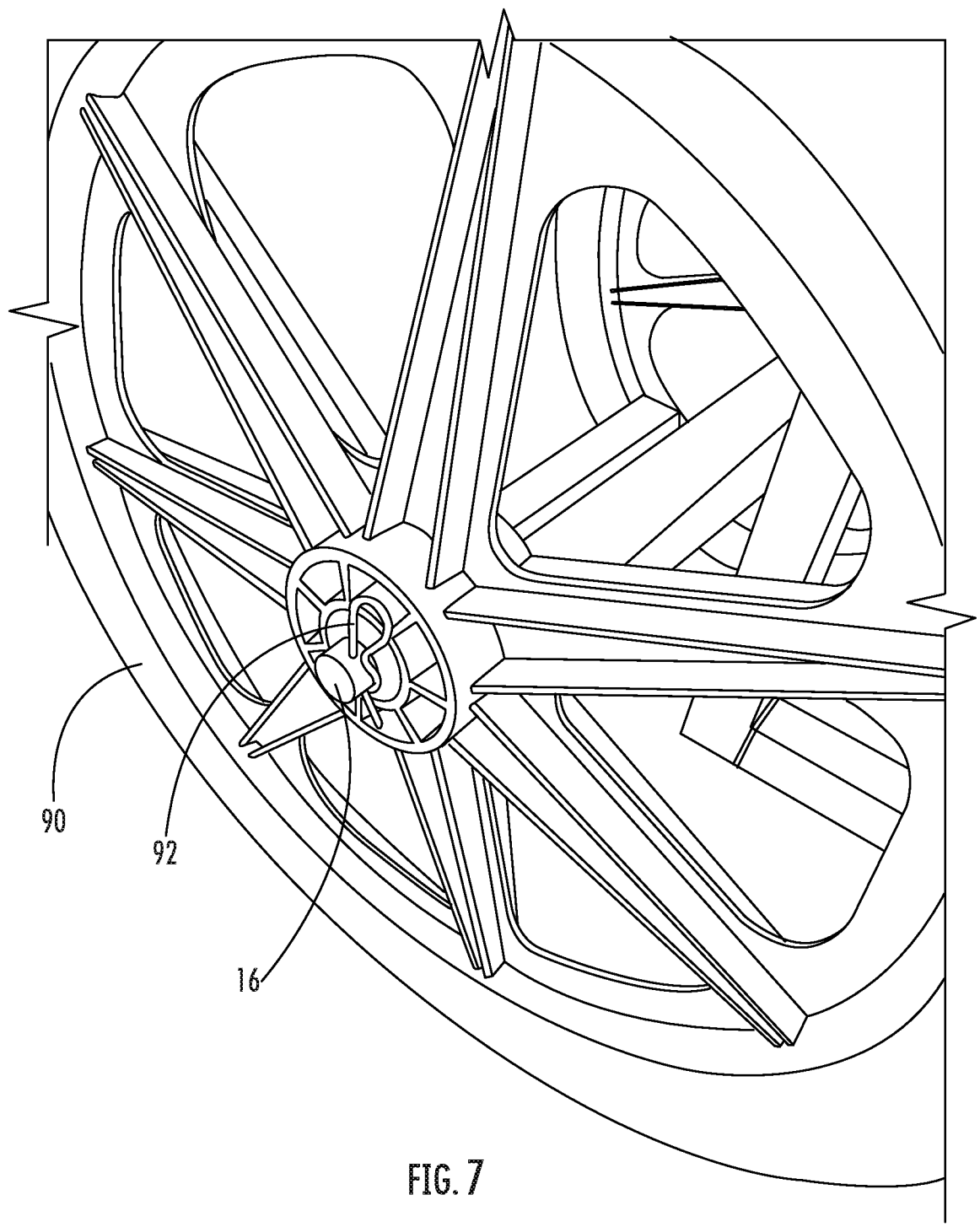
FIGS. 7-11D are various side and front perspective views of the assembly and use of the adjustable multi-use cart of FIG. 1.

To assemble the adjustable multi-use cart 1, the at least one wheel 90 is removably coupled to the at least one axle 16 (as shown in FIG. 7) and the base assembly 30 is coupled to the core assembly 10 at the desired length to accommodate the size of the platform 50 being used (as shown in FIG. 8).

The platform 50 is then coupled to the base assembly 30 (as shown in FIG. 9).

The neck assembly 70 is coupled to the core assembly 10 at the desired height based on the size of the baskets 100 being used and the height of the user (as shown in FIG. 10).

The baskets 100 may then be hung from the basket couplers 78 (as shown in FIGS. 1, 2, and 6.

The adjustable multi-use cart 1 may then be loaded (in baskets 100 and on surface 52) and used to haul tools and equipment (such as air compressor 102, cooler 104, storage box 106, and 5-gallon bucket 108 as shown in FIGS. 11A-11D) long distances over rough terrain, and then may serve as a workstation at the work site, allowing the tools to stay organized and available when they are needed.

To disassemble the adjustable multi-use cart 1, each of the components may be decoupled from the others and then stored.

It will be understood that the assembly of adjustable multi-use cart implementations are not limited to the specific order of steps as disclosed above. Any steps or sequence of steps of the assembly of such implementations indicated herein are given as examples of possible steps or sequence of steps and not as limitations, since various assembly processes and sequences of steps may be used to assemble such implementations. For example, the steps may be rearranged, other steps may be added, or some steps may be omitted without departing from the spirit of this disclosure.

In places where the description above refers to particular implementations, it should be readily apparent that a number of modifications may be made without departing from the spirit thereof and that these implementations may be alternatively applied. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An adjustable multi-use cart comprising:
a core assembly comprising:
an upright frame member comprising an upper neck coupling receiver;
a lower base coupling mount coupled to a front side of a lower end of the upright frame member extending outwardly therefrom;
at least one axle coupled to a back side of a middle of the upright frame member; and
a tilt assist coupled to the back side of the lower end of the upright frame member extending outwardly therefrom;
a base assembly removably coupled with the core assembly, the base assembly comprising:
a main frame member with a proximal core coupling receiver; and
a distal support cross arm coupled to the main frame member;
a platform removably coupled with the base assembly, the platform comprising a substantially upper flat surface defining at least one indentation and at least one base mounting hole;
a neck assembly removably coupled with the core assembly, the neck assembly comprising:
an upright main member with a lower core coupling mount; and
at least one cross arm;
at least one wheel removably coupled with the at least one axle; and
and at least one basket removably coupled with the at least one cross arm of the neck assembly.

2. The adjustable multi-use cart of claim 1, wherein the upper neck coupling receiver is a hole defined in the end of the upright frame member.

3. The adjustable multi-use cart of claim 2, wherein the upper neck coupling receiver has at least one fastener receiving hole therethrough.

4. The adjustable multi-use cart of claim 1, wherein the lower base coupling mount is orthogonal to the upright frame member.

5. The adjustable multi-use cart of claim 1, wherein the lower base coupling mount has at least one fastener receiving hole therethrough.

6. The adjustable multi-use cart of claim 1, wherein the tilt assist is orthogonal to the upright frame member.

7. The adjustable multi-use cart of claim 1, wherein the tilt assist is T-shaped and comprises a distal cross step configured to receive the foot of a user.

8. The adjustable multi-use cart of claim 1, wherein the base assembly is T-shaped.

9. The adjustable multi-use cart of claim 1, the main frame member of the base assembly defines at least one platform mounting hole.

10. The adjustable multi-use cart of claim 1, wherein the main frame member of the base assembly has at least one fastener receiving hole therethrough.

11. The adjustable multi-use cart of claim 1, wherein the proximal core coupling receiver of the base assembly is configured to receive therein and removably couple with the lower base coupling mount of the core assembly.

12. The adjustable multi-use cart of claim 1, wherein the proximal core coupling receiver has at least one fastener receiving hole therethrough.

13. The adjustable multi-use cart of claim 1, wherein the distal support cross arm of the base assembly defines at least one platform mounting hole.

14. The adjustable multi-use cart of claim 1, wherein the at least one cross arm of the neck assembly comprises an upper cross arm and a middle cross arm.

15. The adjustable multi-use cart of claim 1, wherein the at least one cross arm of the neck assembly comprises at least one basket coupler.

16. The adjustable multi-use cart of claim 1, wherein at least one handle is coupled to the at least one cross arm of the neck assembly.

17. The adjustable multi-use cart of claim 1, wherein the lower core coupling mount of the neck assembly has at least one fastener receiving hole therethrough to facilitate removably coupling the core assembly to the neck assembly.

18. The adjustable multi-use cart of claim 1, wherein the at least one wheel comprises two wheels.

19. The adjustable multi-use cart of claim 1, wherein the at least one basket comprises two baskets.

* * * * *